US009454316B2

(12) United States Patent
Barron et al.

(10) Patent No.: US 9,454,316 B2
(45) Date of Patent: Sep. 27, 2016

(54) CLUSTER CONSISTENT LOGICAL STORAGE OBJECT NAMING

(71) Applicant: NetApp, Inc., Sunnyvale, CA (US)

(72) Inventors: Edward Barron, Pepperell, MA (US); James Silva, Bedford, MA (US)

(73) Assignee: NetApp, Inc., Sunnyvale, CA (US)

( * ) Notice: Subject to any disclaimer, the term of this patent is extended or adjusted under 35 U.S.C. 154(b) by 216 days.

(21) Appl. No.: 14/291,783

(22) Filed: May 30, 2014

(65) Prior Publication Data

US 2015/0347043 A1 Dec. 3, 2015

(51) Int. Cl.
*G06F 17/30* (2006.01)
*G06F 3/06* (2006.01)

(52) U.S. Cl.
CPC ............ *G06F 3/0619* (2013.01); *G06F 3/067* (2013.01); *G06F 3/0665* (2013.01); *G06F 3/0689* (2013.01)

(58) Field of Classification Search
CPC .. G06F 17/00; G06F 17/30; G06F 17/30619; G06F 17/30689

USPC .................................................. 707/600–899
See application file for complete search history.

(56) References Cited

U.S. PATENT DOCUMENTS

| 8,996,490 B1* | 3/2015 | Armangau | G06Q 30/02 707/705 |
| 2004/0107422 A1* | 6/2004 | Cabrera | G06F 3/0607 719/310 |

* cited by examiner

*Primary Examiner* — Isaac M Woo
(74) *Attorney, Agent, or Firm* — LeClairRyan, a Professional Corporation

(57) ABSTRACT

A clustered storage environment can distribute responsibility for naming virtual disks to nodes of the clustered storage environment. The clustered storage environment maintains a list of names in a structure that is visible to cluster member nodes responsible for naming the virtual disks. As the cluster member nodes discover mass storage devices (e.g., storage arrays) in the clustered storage environment, the nodes determine identifiers of the mass storage devices. For each mass storage device, the nodes use the mass storage device identifier to establish a namespace for virtual disks of the corresponding mass storage device. The nodes can then provide consistent, exclusive names for the virtual disks throughout the cluster that are manageable names.

18 Claims, 7 Drawing Sheets

CLUSTER CONSISTENT LOGICAL STORAGE OBJECT NAMING

BACKGROUND

Aspects of the disclosure relate to storage systems, and naming logical storage objects in a clustered storage environment.

Storage systems can have various configurations for fault tolerance and desired performance. Generally, the various configurations include multiple paths ("I/O paths") between a server/host machine and a storage object (e.g., logical disk or physical disk) of a storage array through a storage area network (SAN). In the vocabulary of Internet Small Computer Serial Interface (iSCSI), the host machine is referred to as an initiator while the storage array is referred to as a target. An initiator accesses the target with a host bus adapter (HBA). Often, the initiator will have multiple HBAs. A controller for a storage array often has multiple ports that allow access to the storage objects of the storage array. Each port can be presented as a different target port for accessing the storage objects. Each HBA and target port pairing can define a path to a storage object. The number of I/O paths can be great in an enterprise storage system with multiple switches and any number of initiators and targets. With virtualization, the number of paths grows even more since a single physical storage array can be presented as a large number of logical storage objects accessible through a number of virtual ports.

BRIEF DESCRIPTION OF THE DRAWINGS

The disclosure may be better understood by referencing the accompanying drawings.

DESCRIPTION OF ILLUSTRATION(S)

Figure 1:
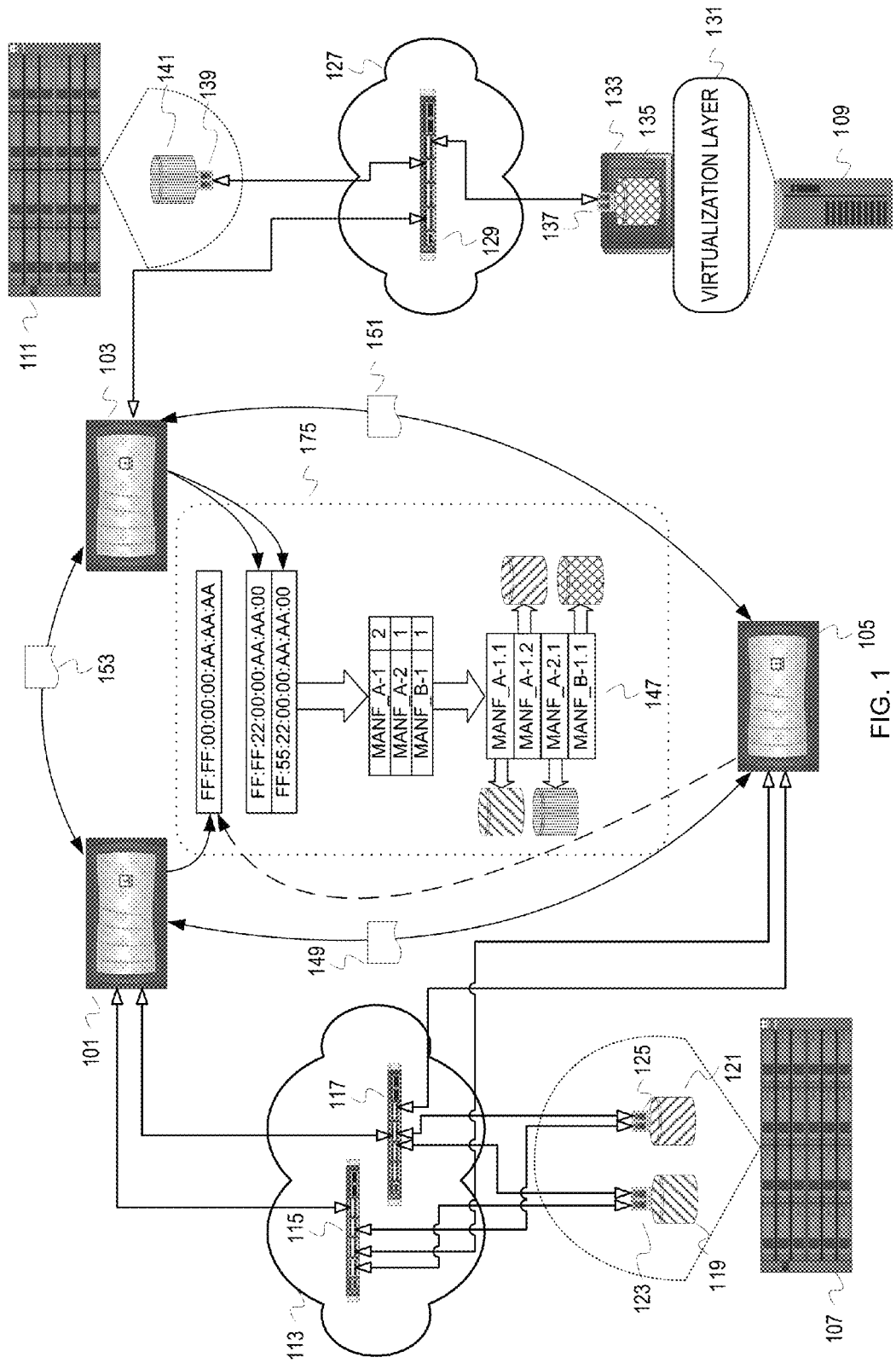
FIG. 1 depicts a conceptual diagram of an example scenario for consistent naming of logical storage objects in a cluster by member nodes.

The description that follows includes example systems, methods, techniques, instruction sequences and computer program products that embody techniques of the disclosure. However, it is understood that the disclosure may be practiced without these specific details. For instance, although examples refer to In other instances, well-known instruction instances, protocols, structures and techniques have not been shown in detail in order not to obfuscate the description.

In storage environments, storage object naming/identifying allows for ease of storage object identification. Storage object identification, in particular for logical storage objects, is used for a variety of reasons that can include management of a storage environment. Storage object naming techniques name logical storage objects (herein referred to as "virtual disks" for compactness) based on a corresponding I/O path. This is considered to be a node centric naming technique because it is from the perspective of the accessing node (e.g., initiator node), which accesses the logical storage object via the I/O path. Storage environments will have a large number of paths for fault tolerance and/or performance (e.g., using multipathing or multipath I/O). Thus, a single virtual disk will have multiple names among different nodes and may have multiple names within a single node. In a clustered storage environment with multiple I/O paths, a single virtual disk will have numerous names within the clustered storage environment ("cluster"). Managing a cluster in which each virtual disk is associated with multiple names can be problematic.

A clustered storage environment can employ a logical storage object naming technique that is path independent, and thus not node centric. This avoids a myriad of names for each virtual disk within a cluster. A clustered storage environment can distribute responsibility for naming virtual disks to nodes of the clustered storage environment. In the context of this description, a node refers to a device that generates requests (e.g., read requests, write requests, management requests, etc.), which may be on behalf of another device (e.g., client device). The clustered storage environment maintains a list of names in a structure that is visible to cluster member nodes responsible for naming the virtual disks. As the cluster member nodes discover mass storage devices (e.g., storage arrays) in the clustered storage environment, the nodes determine identifiers of the mass storage devices. For each mass storage device, the nodes use the mass storage device identifier to establish or define a namespace for virtual disks of the corresponding mass storage device. The nodes can then provide consistent, exclusive names for the virtual disks throughout the cluster that are manageable names. This description uses the term "namespace" to refer to a space of names and not necessarily actual instantiations or a specific group of names. For example, establishing or defining a namespace "NTAP" for a storage array means that the name "NTAP" is now set aside for naming logical storage objects of that particular storage array. Setting aside a name to define or establish a namespace can take various forms (e.g., setting a field that binds an array identifier to the name, setting a pointer that references an element that indicates the name, etc.). It does not necessarily mean that several entries in a data structure are now populated with the name "NTAP" in expectation of the logical storage objects to be discovered.

FIG. 1 depicts a conceptual diagram of an example scenario for consistent naming of logical storage objects in a cluster by member nodes. For simplicity, FIG. 1 only depicts only a limited number of elements of a clustered storage environment. FIG. 1 only depicts four logical storage objects, three member nodes with naming functionality, and two storage arrays. As an example of diversity, FIG. 1 also depicts a logical storage object presented from a virtualization layer to show that a logical storage object can be separated by any number of degrees from a physical storage device. Regardless of the underlying infrastructure, cluster member nodes can name logical storage objects presented to them.

Topography of Example Clustered Storage Environment

The illustrated clustered storage environment includes a cluster member node 101 and a cluster member node 105 with I/O paths to a storage array 107. The cluster member nodes 101, 105 connect through a switching layer 113 to the storage array 107. The cluster member node 101 has an I/O path to the storage array 107 via a switch 115. The cluster member node 101 also has an I/O path to the storage array 107 via a switch 117. The cluster member node 105 also has an I/O path to the storage array 107 via the switch 115 and an I/O path to the storage array 107 via the switch 117.

The illustrated clustered storage environment also includes a cluster member node 103 with I/O paths to a storage array 111 and a virtual mass storage device 133. The cluster member node 103 connects through a switching layer 127 to the storage array 111 and to a host machine 109 that hosts the virtual mass storage device 133. The host machine 109 hosts a virtualization layer 131. The virtualization layer 131 presents the virtual mass storage device 133. The cluster member node 103 has I/O paths to the storage array 111 and the virtual mass storage device 133 via a switch 129.

The storage array 107 has been configured with at least two logical storage objects 119, 121. The logical storage object 119 is accessible through two ports 123. A port can be a physical port, a logical port, or a combination of a physical port and a logical port. The logical storage object 121 is accessible through two ports 125. Previously, the individual ports would influence naming of the logical storage objects since the individual ports are part of the path identifier. This would result in the logical storage object 119 having different names from the perspectives of the different cluster member nodes 101, 105.

As described earlier, FIG. 1 depicts the cluster member node 103 with I/O paths to logical storage objects with different backing storage. The storage array 111 has been configured with at least one logical storage object 141. The logical storage object 141 is accessible through at least one of two ports 139. The virtualization layer 131 has instantiated the virtual mass storage device 133, which has a logical storable object 135 configured. The cluster member node 103 accesses the logical storage object 135 through at least one of the ports 137. In this case, the ports 137 are virtual ports instantiated by the virtualization layer 131.

FIG. 1 depicts a limited number of I/O paths to avoid presenting a confusing figure. Since this is a clustered storage environment, the cluster member node 103 also has paths to logical storage objects of the storage array 107. Similarly, the cluster member nodes 101, 105 have paths to logical storage objects of the storage array 111 and virtual mass storage devices instantiated by the virtualization layer 131. In addition, the cluster member nodes 101, 103, 105 have alternative paths to the logical storage objects that are not depicted.

Naming in the Example Clustered Storage Environment

In this illustration, the cluster member nodes 101, 103, 105 participate in a discovery process, for example during cluster start up, to discover elements of the cluster. The cluster member node 101 discovers the storage array 107 during a discovery process that includes recording identifiers supplied from the discovered elements. A dashed rounded rectangle 175 surrounds data recorded as part of the discovery process and the naming. This is not intended to suggest that all of this data must be stored together. The dashed border 175 is used merely to convey the relationship among the data from discovery and for naming. As mentioned in this description, the data can be maintained and recorded in various places and by different actors. During the depicted discovery process, the storage array 107 supplies an identifier that uniquely identifies itself, at least within the cluster. For instance, the storage array 107 can respond to the cluster member node 101 with a unique identifier FF:FF:00:00:00:AA:AA:AA, as illustrated in the FIG. 1. A dashed line from the cluster member node 105 indicates the possibility that the cluster member node 105 also discovers the storage array 107 and records the identifier. The cluster member node 103 discovers the storage array 111 and the virtual mass storage device 133. The storage array 111 supplies an identifier FF:FF:22:00:00:AA:AA:00 that uniquely identifies itself, at least within the cluster. The virtual mass storage device 133 supplies an identifier FF:55:22:00:00:AA:AA:00 that uniquely identifies itself, at least within the cluster. The identifier for the virtual mass storage device 133 may be derived from a unique identifier of the host machine 109. The identifier for the virtual mass storage device 133 may be one of a pool of unique identifiers reserved for virtual machines. Regardless of how the identifier is generated or assigned, the cluster member node 105 treats the virtual mass storage device 133 as if it were a physical storage device.

The cluster member nodes 101, 103, 105 can decompose the identifiers into more granular identifying information (e.g., manufacturer name, product name, model name, serial number, distributor, etc.). With this more manageable, user-friendly identifying information, the cluster member nodes 101, 103, 105 derive more compact identifiers. In this illustration, the cluster member node 101 determines that the identifier FF:FF:00:00:00:AA:AA:AA for the storage array 107 indicates a manufacturer A. The cluster member node 103 determines that the identifier FF:FF:22:00:00:AA:AA:00 for the storage array 111 also indicates the manufacturer A. Since this illustration uses manufacturer name to derive a compact identifier, storage arrays from the same manufacturer are disambiguated with a counter. Thus, the cluster member node 101 derives a compact identifier MANF_A-1 for the storage array 107. And the cluster member node 103 derives a compact identifier MANF_A-2 for the storage array 111. For the virtual mass storage device 133, the cluster member node 103 determines that the identifier FF:55:22:00:00:AA:AA:00 for the virtual mass storage device 133 indicates a manufacturer B. Although disambiguation is not necessary in this illustration, the cluster member node 103 derives a compact identifier MANF_B-1 as a default in anticipation of the cluster having another element from manufacturer B instead of later changing this compact identifier if another manufacturer B element is discovered.

With the compact identifiers, the cluster member nodes 101, 103, 105 have established namespaces for logical storage objects of the discovered mass storage devices. The cluster member nodes 101, 103, 105 then determine values to specify names of the logical storage objects within these namespaces. For this illustration, a counter is used within each namespace for namespace unique values. For the namespace MANF_A-1, two logical storage objects have been discovered. Either or both of the cluster member nodes 101 assigns '1' to the logical storage object 119 and '2' to the logical storage object 121. Hence, the name for the logical storage object 119 within the cluster is MANF_A-1.1. The name for the logical storage object 121 within the cluster is MANF_A-1.2. The cluster member node 103 names the logical storage object 141 MANF_A-2.1 and the logical storage object 135 MANF_B.1.

Since the logical storage object names are cluster wide, the cluster member nodes 101, 103, 105 coordinate to at least reduce repetition of work and integrity of the names. In the depicted example clustered storage system, the cluster member nodes 101, 103, 105 exchange data to coordinate. Each of the cluster member nodes 101, 103, 105 maintains a local version of the discovered devices and logical storage object names. When new information is obtained (e.g., a new mass storage device is discovered), the other cluster member nodes are notified. For instance, when the cluster member node 101 discovers the storage array 107, the identifier for storage array 107 is communicated to the other cluster member nodes 103, 105. When the cluster member node 105 discovers the storage array 107 after already being notified of the storage array 107 by the cluster member node 101, the cluster member node 105 discards its discovered information because it already has the identifier from the cluster member node 101. The circulation of notifications is depicted with the data/notifications 149, 151, 153.

This coordination also helps the disambiguation of compact identifiers. In this illustration, the cluster member node 103 will have received a notification that the cluster member node discovered the storage array 107 with an identifier that indicates manufacturer A. The cluster member node 103 will also receive a notification that the cluster member node 101 has derived a compact identifier MANF_A-1. With this information, the cluster member node 103 will derive the compact identifier MANF_A-2 for the storage array 111, and notify the other cluster member nodes.

Although FIG. 1 was described with reference to coordination of information among cluster member nodes with notifications, other techniques can be used. For instance, a transactional database accessible by the cluster member nodes can host discovery information and logical object names. The transactional database mechanisms will prevent the cluster member nodes from corrupting the names or entering redundant information into the transactional database. As another example technique, a cluster can employ a less parallel discovery process. Cluster member nodes may be limited to discovering specific parts of a cluster. Or cluster member nodes may be assigned a token or particular time period for discovering mass storage devices of the clustered storage environment. When not discovering mass storage devices, a cluster member node can discover the logical storage objects on mass storage devices discovered by that cluster member node.

Illustrative Flowcharts

Figure 2:
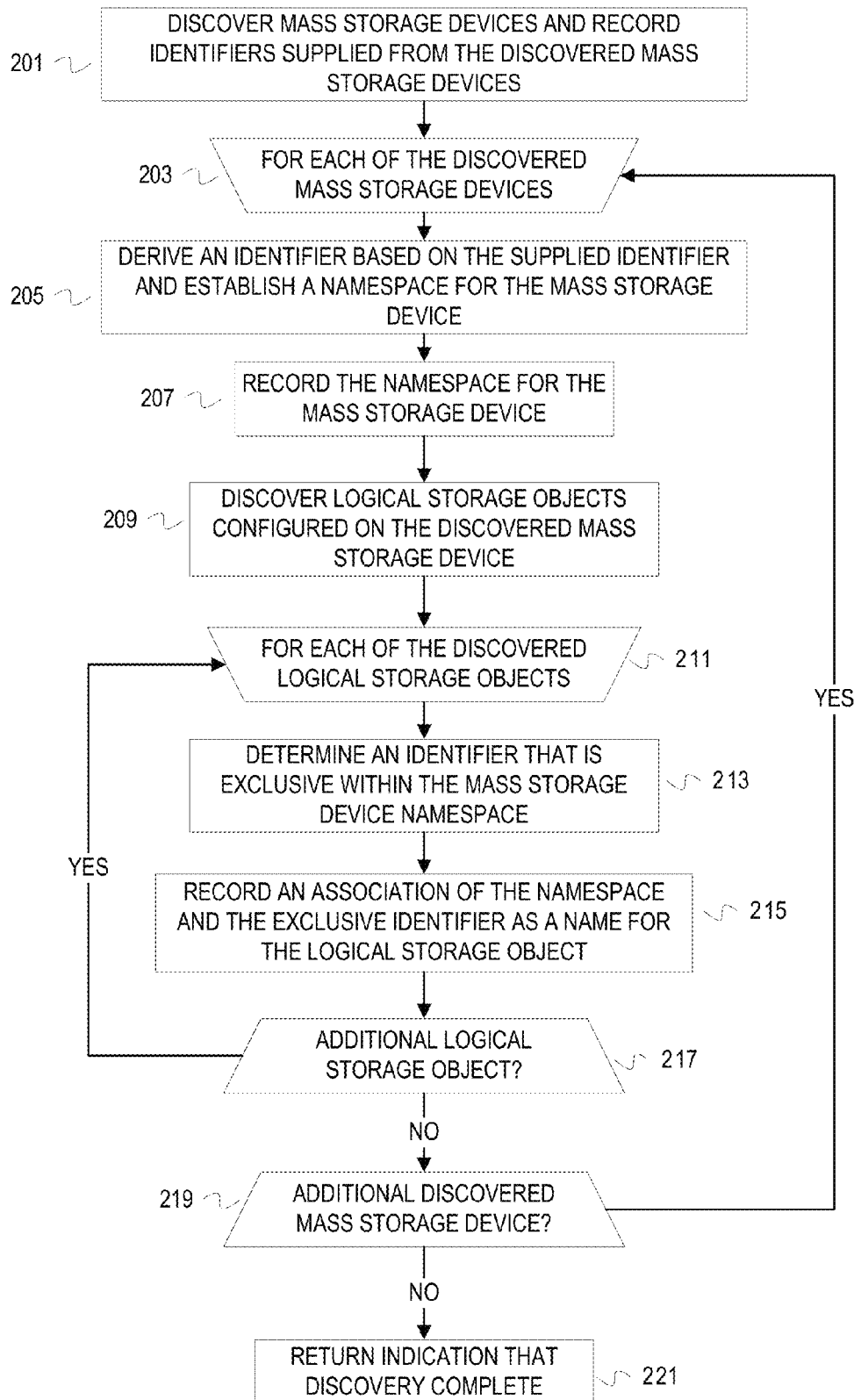
FIG. 2 depicts a flowchart of example operations for consistent logical storage object naming in a clustered storage environment.

FIG. 2 depicts a flowchart of example operations for consistent logical storage object naming in a clustered storage environment. The operations in the flowcharts are described with reference to a node performing the operations to avoid obfuscating the disclosure with arbitrary or aspect specific program unit names. The operations also refer to discovery. Specific details for discovering devices are not provided since these details vary based on the underlying technology. For instance, discovery details in a clustered storage environment that uses the Internet Small Computer System Interface (iSCSI) protocol based infrastructure will be different than one that uses a Fibre Channel infrastructure.

At block 201, a node discovers mass storage devices and records identifiers supplied from the discovered mass storage devices. For instance, a discovery process running on a node may send discovery messages from each interface (e.g., host bus adapter) of the node. These discovery messages may be broadcast or may be sent to specified addresses that were previously reported. For instance, controllers for mass storage devices may send out their addresses when connected to a network. The discovery messages from the node request information about storage devices (e.g., amount of storage, type of storage device, etc.). When responding, these mass storage devices at least provide an identifier, such as a universally unique identifier (UUID), a world wide port name (WWPN), or a world wide node name (WWNN). The identifiers supplied by the mass storage devices (or controllers of the mass storage devices) are recorded into some persistent memory on a node.

At block 203, a loop of operations begins for each of the discovered mass storage devices. The loop of operations in this flowchart includes odd numbered blocks from 205 to 217, ending at block 217.

At block 205, the node derives an identifier for the mass storage device based, at least partly, on the supplied identifier, and establishes a namespace for the mass storage device based on the derived identifier. For example, the node may receive a 64 byte identifier that identifies the mass storage device. The node accesses data that maps different segments of the 64 byte identifier to device information. The identifier may decompose into values that represent a manufacturer/vendor, product name, model number, and serial number. The node derives one of these values as a derived identifier for the mass storage device. For example, the node can use the manufacturer name as the derived identifier. The node could use the manufacturer name and the product name concatenated together as the derived identifier. With the derived identifier, the node establishes a namespace for the mass storage device.

At block 207, the namespace is recorded for the mass storage device. The namespace (e.g., manufacturer name) is associated with the device identifier. For example, a structure that hosts the device identifier is updated with a pointer to an entry of another structure that indicates the manufacturer's name.

At block 209, the node discovers the logical storage objects configured on the discovered mass storage device. The node may send a request to the mass storage device, and the mass storage device responds with a list of the logical storage objects configured on it. As another example, the node may query each port of the mass storage device that is visible to the node. The mass storage device responds with an indication of the logical storage object(s) associated with the port.

At block 211, an internal loop of operations begins for each of the discovered logical storage objects. This internal loop of operations includes blocks 213 and 215, with an ending control block at block 217.

At block 213, the node determines an identifier that is exclusive within the mass storage device namespace. Assuming the namespace is SPIN, then the node determines a value that has not been associated with SPIN already. For example, logical storage objects of a storage array with namespace SPIN may have already been named SPIN.a and SPIN.b. So, the values or identifiers 'a' and 'b' have already been used in the namespace SPIN. A next logical storage object of the SPIN mass storage device can be named SPIN.c or SPIN.hi, since neither of those values had been used in the SPIN namespace. Determination of the value or identifier exclusive within a namespace can vary from using a counter to complex mutations of values to avoid reuse of a value within the namespace.

At block 215, the node records an association of the namespace and the exclusive identifier as a name for the logical storage object. The node can record the association by adding a new entry into a structure that hosts logical storage object names within the cluster. The node can record the association by setting a pointer in a first structure of mass storage namespaces to reference a mutating value.

At block 217, the node determines whether there is an additional storage object. If there is, then control flows back to block 211. Otherwise, control continues to block 219.

At block 219, the node determines whether there is another discovered mass storage device. If there is another discovered mass storage device, then control flows to block 203. Otherwise, control flows to block 221.

At block 221, the process naming the logical storage objects returns an indication that discovery has been completed. This may be an initial discovery that has completed. A node may be configured to perform additional discoveries during the life of a clustered storage environment.

Figure 3:
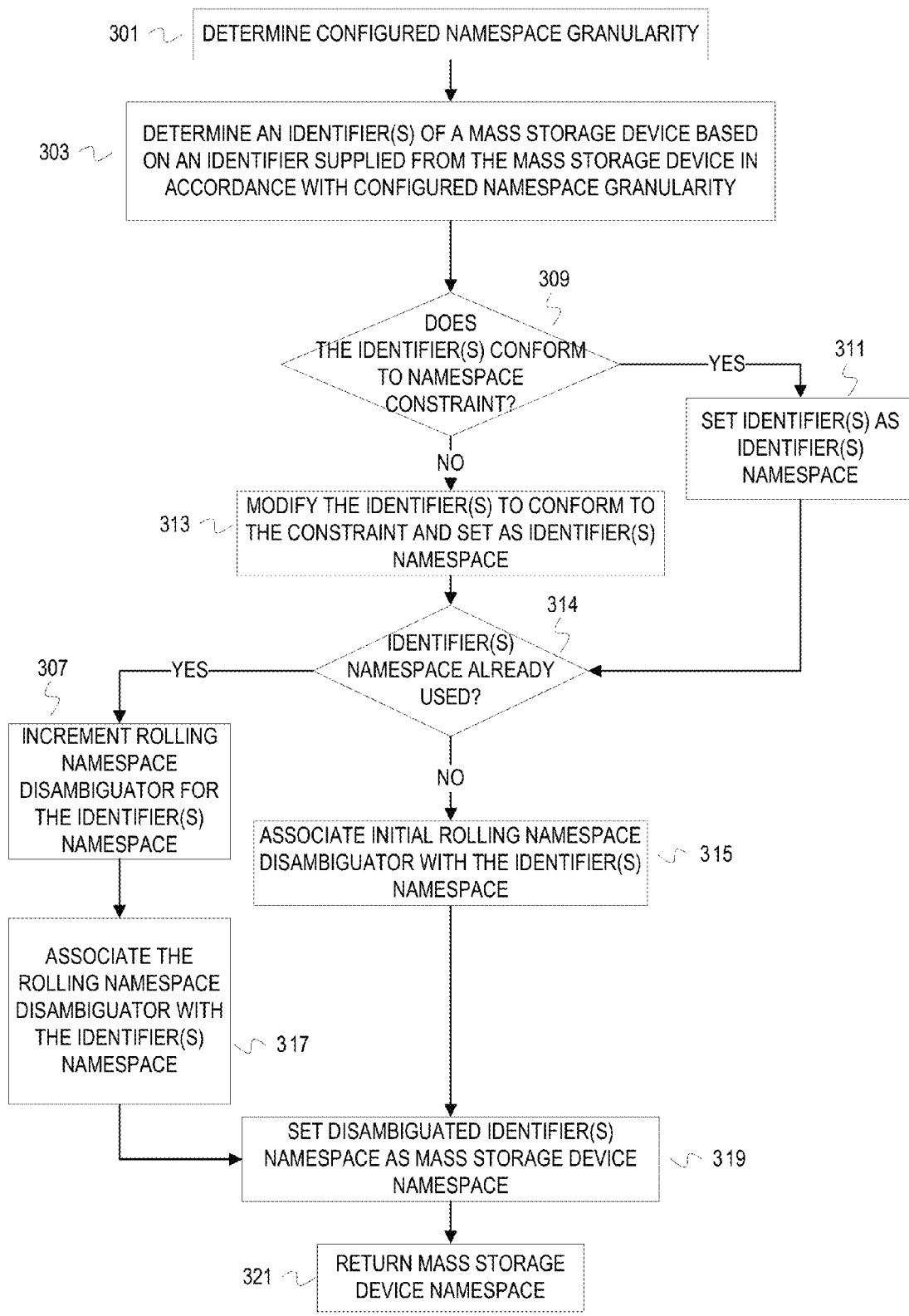
FIG. 3 depicts a flowchart of example operations for deriving an identifier from the mass storage device identifier.

FIG. 3 depicts a flowchart of example operations for deriving an identifier from the mass storage device identifier. The operations of FIG. 3 can be an example for block 205 of FIG. 2 or block 609 of FIG. 6.

At block 301, a node determines a configured namespace granularity. In the earlier examples, the namespace for logical object naming was based on a manufacturer name. A namespace, however, can be established at other levels of granularity with additional information, such as additional information indicated by a device identifier. The node can be configured to derive an identifier based on both a manufacturer name and a product name, for example. The node can be configured to derive an identifier based on manufacturer name, product name, and installation year. This namespace granularity can be configured for all discovered storage devices or vary based on some criterion. For instance, a finer level of granularity (e.g., manufacturer name, product name, and model number) can be used if there are less than a certain number of mass storage devices in a cluster and/or for particular manufacturers.

At block 303, the node determines an identifier(s) of a mass storage device based on an identifier supplied from the mass storage device in accordance with the configured namespace granularity. As already mentioned, the node can determine a first identifier (manufacturer name) and a second identifier (product name) from a device identifier depending upon the configured namespace granularity.

At block 309, the node determines whether the identifier(s) conforms to a namespace constraint. For instance, a namespace constraint may be three consonant characters. If the identifier(s) does not conform to a namespace constraint, then control flows to block 313. If the identifier(s) conforms to the namespace constraint, then control flows to block 311.

At block 313, the node modifies the identifier(s) to conform to the namespace constraint, and sets the conforming modified identifier(s) as the namespace for the identifier(s). For example, a namespace constraint may be three characters. If a manufacturer name exceeds three characters, then the manufacturer name is truncated to three characters. The namespace constraint can be defined to vary with the configured namespace granularity. For example, a namespace granularity of product name may increase the namespace constraint to six characters to be divided between manufacturer name and product name. Thus, the namespace would be three characters from the manufacturer's name and three characters from the product name.

If the node determined that the identifier(s) conformed to the namespace constraint at block 309, then the node sets the identifier(s) as the namespace for the identifier(s) at block 311. Control flows from block 311 to block 314.

At block 314, the node determines whether the identifier(s) namespace has already been used. In other words, the node determines whether a mass storage device with the identifier(s) has already been discovered. The node can access a structure that indicates identifier(s) of already discovered mass storage devices. If namespace granularity is configured for manufacturer name and product name, then the node will determine whether a mass storage device has already been discovered with the same manufacturer name and product name. In some aspects of the disclosure, the node will determine whether a same identifier has already been reported. In some cases, this determination is a side effect or result of the node attempting to write/commit an identifier(s) namespace into a cluster visible structure. For example, a node may attempt to commit (e.g., notify other cluster member nodes) an identifier(s) namespace and receive a notification that the identifier(s) namespace is redundant. If the identifier(s) namespace has already been used, then control flows to block 307. If no mass storage device with the identifier(s) has yet to be discovered, then control flows to block 315.

At block 315, the node associates an initial rolling namespace disambiguator with the namespace established for the identifier(s) of the mass storage device. A clustered storage environment likely has multiple storage devices from a manufacturer. In anticipation of discovering another mass storage from the same manufacturer, a disambiguation value is used. Although this disambiguator can vary, a simple illustration is using a counter. Thus, an identifier namespace of MANF_A and the initial disambiguator of '1' would result in an initial mass storage device namespace of MANF_A-1, assuming concatenation with a delimiter '-'.

At block 319, the node sets the disambiguated identifier(s) namespace as the mass storage device namespace.

At block 321, the mass storage device namespace is returned.

If the node determined at block 314 that the identifier(s) namespace was already used, then the node increments a rolling namespace disambiguator for the identifier(s) namespace at block 307. Referring to the counter example, the disambiguator would be incremented to '2'.

At block 317, the node associates the incremented namespace disambiguator with the identifier(s) namespace. Control flows from block 317 to block 319.

Figure 4:
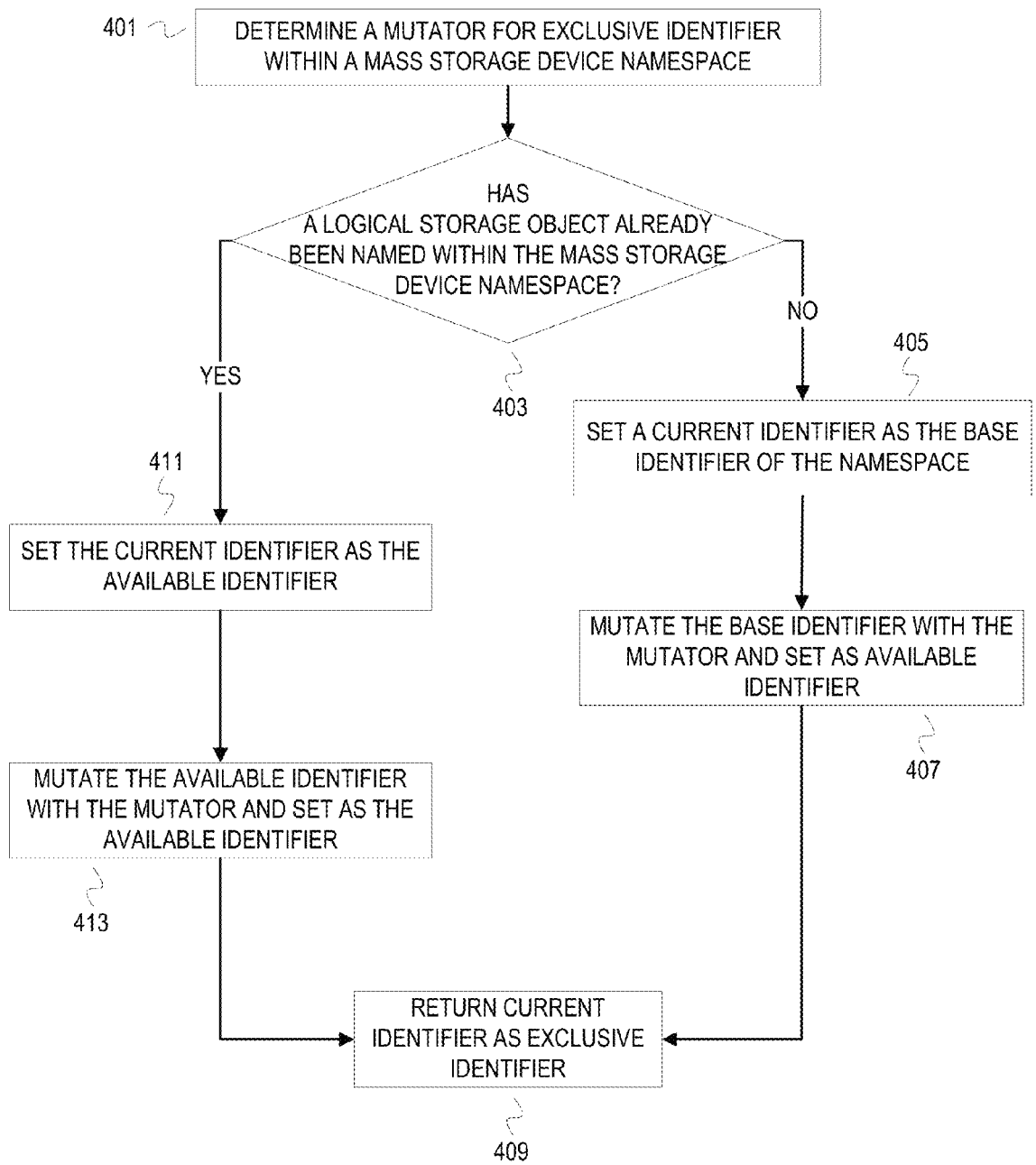
FIG. 4 depicts a flowchart of example operations for determining an exclusive identifier within a mass storage device namespace for logical storage object naming.

FIG. 4 depicts a flowchart of example operations for determining an exclusive identifier within a mass storage device namespace for logical storage object naming. The example operations of FIG. 4 can be an example of block 213 in FIG. 2 or block 617 of FIG. 6.

At block 401, a node determines a mutator for an exclusive identifier within a mass storage device namespace. Referring to the preceding example, the mutator can be an increment operation. However, a mutator can take be implemented in a variety of ways (e.g., traversing an alphabet, various alphanumeric combinations, etc.).

At block 403, the node determines whether a logical storage object has already been named within the mass storage device namespace. As with the mass storage device namespace, the node can make this determination in accordance with various techniques. For example, the node can access a structure that indicates logical storage objects named within a mass storage device namespace. The node can attempt to write/commit a logical storage object name to determine whether that name has already been used. If a logical storage object has been named within the mass storage device namespace, then control flows to block 411. Otherwise, control flows to block 405, which is the path taken when no logical storage objects have been named within the mass storage device namespace.

At block 405, the node sets a current identifier as a base identifier of the mass storage device namespace. If the base identifier is '1', then the current identifier is set to '1'.

At block 407, the node mutates the base identifier with the mutator and sets the mutated base identifier as an available identifier. For example, the base identifier '1' is incremented to '2' and an available identifier variable is set to '2'.

At block 409, the current identifier is returned for use in naming the logical storage object.

If the node determined that a logical storage object had already been named in the mass storage device namespace at block 403, then the node sets the current identifier to be the available identifier.

At block 413, the node mutates the available identifier with the mutator and sets the available identifier to be the mutated available identifier. This could be expressed as

```
available_id=available_id++;
```

Control flows from block 413 to block 409.

Figure 5:
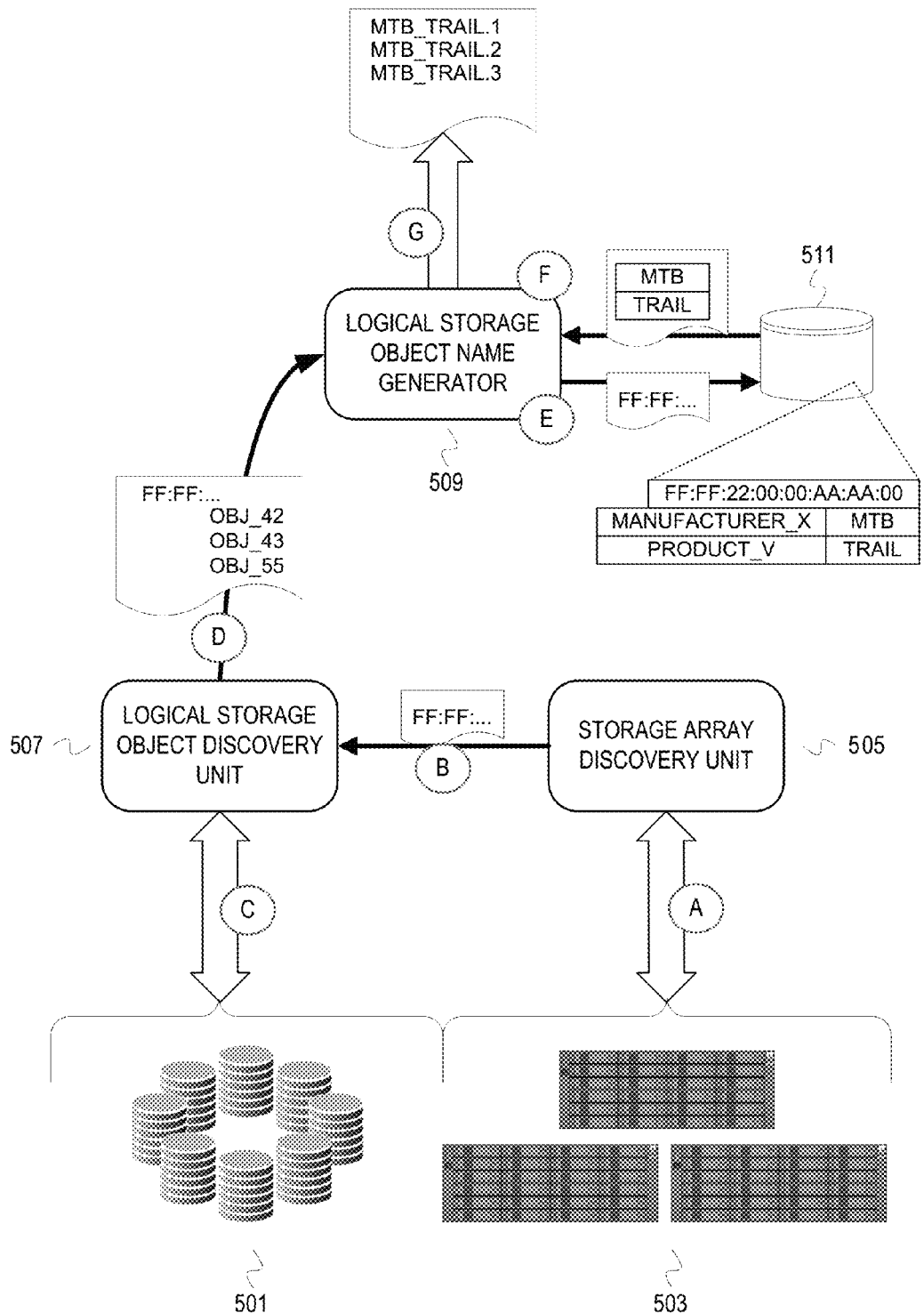
FIG. 5 depicts a conceptual diagram of a node configured to divide responsibilities among different units for efficient logical storage object naming within a cluster.
Figure 6:
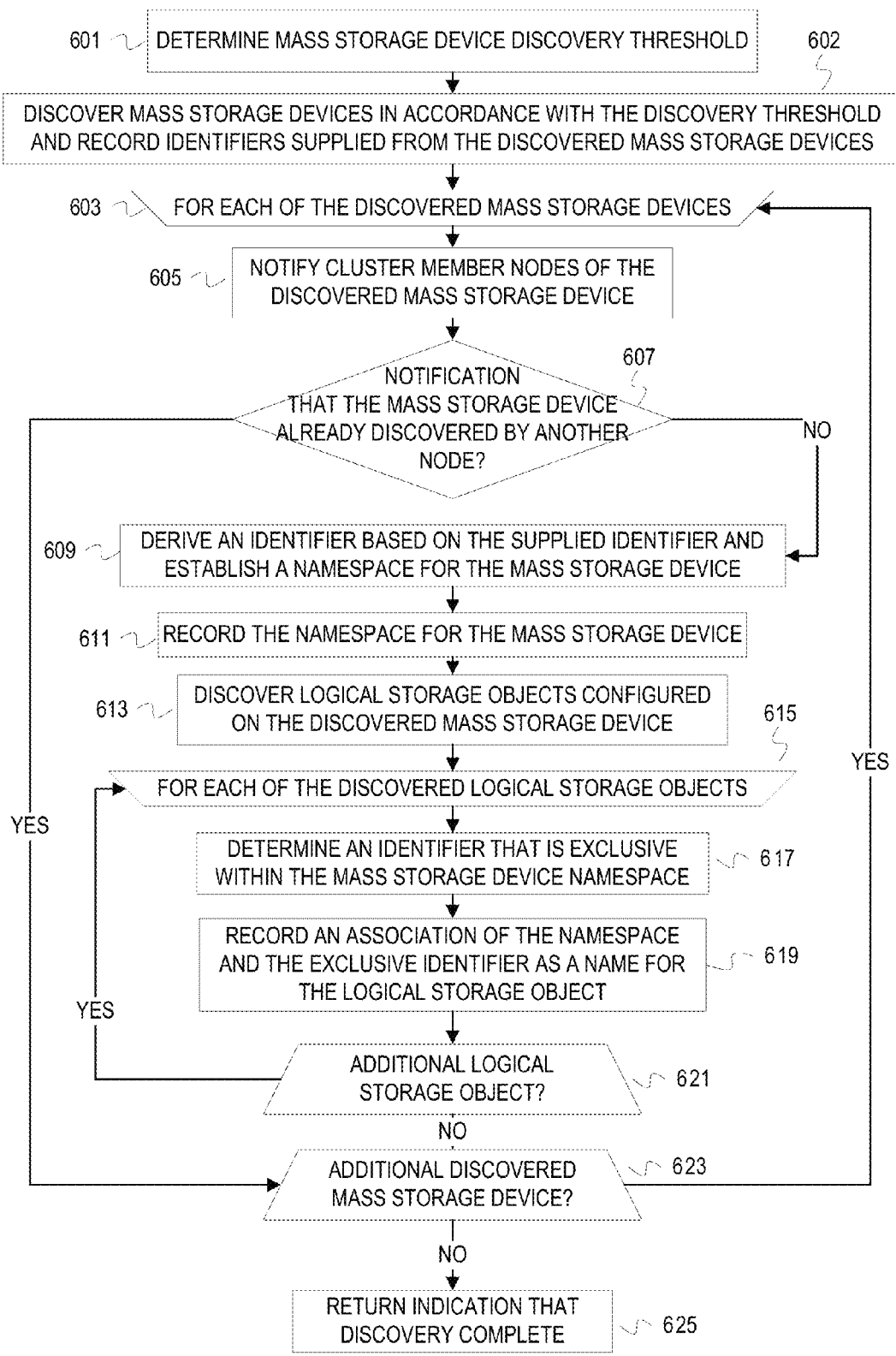
FIG. 6 depicts an example flowchart of operations for logical storage object naming that addresses a technique for reducing redundant device discovery.

Although the example operations of the flowcharts have been described with general reference to a node, responsibilities for operations can be separated into different processes running on the node. This separation of operations can allow for configuration of the naming and discovery process. As with the various aspects of namespace granularity and identifier mutation that have been described as configurable, configuring the discovery and naming process can facilitate efficient logical storage object naming. FIG. 1 presumed a configuration that allows all cluster member nodes to perform discovery in parallel and discard/ignore redundancies. Aspects can configure a node to separate the responsibilities of mass storage device discovery, logical storage object discovery, and logical storage object naming. In addition, aspects can configure a discovery threshold and discover mass storage devices up to the discovery threshold. Once the threshold is met, the node can discover logical storage objects of the mass storage devices discovered by the node. FIGS. 5 and 6 present different aspects of these variations.

FIG. 5 depicts a conceptual diagram of a node configured to divide responsibilities among different units for efficient logical storage object naming within a cluster. In FIG. 5, a node includes a storage array discovery unit 505, a logical storage object discovery unit 507, and a logical storage object name generator 509. Each of these depicted units represents an instantiation (e.g., a process(es)) of a program, routine, function, procedure, or application. However, any one of these units can be implemented as hardware (e.g., an application specific integrated circuit) or a combination of hardware and program code (e.g., a controller programmed with firmware). FIG. 5 also depicts a database 511 that is accessible by the node. The database 511 relates mass storage device identifiers to the information indicated by the mass storage device identifiers. In this illustration, the database 511 also relates the information to aliases that have been configured. Example operations are represented by markers A-G. Although some degree of serial operation is intended, not all operations are required to be performed in series. In addition, some operations can overlap with others as more devices are discovered.

At a stage A, the storage array discovery unit 505 discovers a storage array among multiple storage array 503 in a clustered storage environment. The storage array identifies itself as FF:FF:22:00:00:AA:AA:00.

At a stage B, the storage array discovery unit 505 communicates the device identifier to the logical storage object discovery unit 507. The storage array discovery unit 505 can send a message to the logical storage object discovery unit 507. The storage array discovery unit 505 may write the identifier to a structure. That write may trigger a notification to the logical storage object discovery unit 507. In some aspects, the logical storage object discovery unit 507 will periodically access the structure of storage array identifiers to determine whether another storage array has been discovered. If another node has already discovered the storage array, then the storage array discovery unit 505 will be notified of the redundancy and the logical storage object discovery unit will not act upon the redundant discovery. The storage array discovery unit 505 will continue trying to discover other storage arrays. The storage array discovery unit 505 can be configured to take actions to avoid further redundant discoveries. As one example, the storage array discovery unit 505 can be configured to pause from discovery for a timeout period after n redundancies. As another example, the storage array discovery unit 505 can be configured to switch discovery to a different port or adapter after n redundancies and/or after a timeout period.

Assuming the storage array discovery is not redundant, the logical storage object discovery unit 507 will proceed with discovering the logical storage objects configured on the discovered storage array at stage C. All of the logical storage objects of the clustered storage environment are depicted as a group of logical storage objects 501. After discovering the logical storage objects configured on the discovered storage array, the logical storage object discovery unit 507 communicates the discovered logical storage objects to the logical storage object name generator 509 at stage D. In this illustration, the logical storage object unit 507 has discovered logical storage objects OBJ_42, OBJ_43, and OBJ_55. The logical storage object discovery unit 507 can then proceed with discovery of logical storage objects for the next storage array discovered by the storage array discovery unit 505.

At stage E, the logical storage object name generator queries the database 511 with the identifier of the discovered storage array. According to the data in the database 511, the device identifier indicates that the storage array is from a manufacturer MANUFACTURER_X and is a product PRODUCT_V. The data also indicates aliases for these identifiers. For MANUFACTURER_X, an alias MTB has been configured. For PRODUCT_V, an alias TRAIL has been configured. Instead of the logical storage object name generator 509 retrieving the identifiers MANUFACTURER_X and PRODUCT_V, the logical storage object name generator 509 retrieves MTB and TRAIL at stage F. Assuming a namespace granularity of product has been configured, the logical storage object name generator 509 uses both aliases to establish a name space for the discovered storage array—MTB_TRAIL.

At stage G, the logical object name generator 509 generates the logical storage object names within the MTB_TRAIL namespace for the discovered storage array. The logical object name generator 509 names the logical storage objects OBJ_42, OBJ_43, and OBJ_55 as MTB_TRAIL.1, MTB_TRAIL.2, and MTB_TRAIL.3, respectively.

FIG. 6 depicts an example flowchart of operations for logical storage object naming that addresses a technique for reducing redundant device discovery. With the exception of blocks 601, 607, and 609, the operations are similar to the operations of FIG. 2.

At block 601, a node determines a mass storage device discovery threshold. The discovery threshold can be a default, programmed threshold, which can be configured by an administrator. This threshold can take various forms. A mass storage device discovery threshold can be defined as a number of mass storage devices, a time period for discovery, an average time per each discovered mass storage device, etc.

At block 602, the node discovers mass storage devices in accordance with the mass storage device discovery threshold, and records identifiers supplied from the discovered mass storage devices. For instance, a discovery process running on a node may send discovery messages from each interface (e.g., host bus adapter) of the node. These discovery messages may be broadcast or may be sent to specified addresses that were previously reported. For instance, controllers for mass storage devices may send out their addresses when connected to a network. The discovery messages from the node request information about storage devices (e.g., amount of storage, type of storage device, etc.). When responding, these mass storage devices at least provide an identifier (e.g., UUID, WWPN, WWNN). The identifiers supplied by the mass storage devices (or controllers of the mass storage devices) are recorded into some persistent memory.

At block 603, a loop of operations begins for each of the discovered mass storage devices. The loop of operations in this flowchart includes odd numbered blocks from 605 to 621, ending at block 623.

At block 605, the node notifies cluster member nodes of the discovered mass storage device. This notification can take various forms depending upon the coordination implemented in the clustered storage environment. The notification may be writing the device identifier to a local table and pushing the table to the other cluster member nodes. The node may notify cluster member nodes with a broadcast message. As another example, the node may write to a centralized database.

At block 607, the node determines whether a notification is received that the mass storage device has already been discovered by another cluster member node. Aspects can generate this notification from another node in response to the node attempting to push the local table or an entry of the local table to the other cluster member nodes. If another node has already discovered the mass storage device, then control flows to block 623. Otherwise, control continues to block 609.

At block 609, the node derives an identifier for the mass storage device based, at least partly, on the supplied identifier, and establishes a namespace for the mass storage device based on the derived identifier. For example, the node may receive a 64 bit identifier that identifies the mass storage device. The node accesses data that maps different segments of the 64 bit identifier to device information. The identifier may decompose into values that represent a manufacturer/vendor, product name, model number, and serial number. The node derives one of these values as a derived identifier for the mass storage device. For example, the node can use the manufacturer name as the derived identifier. The node could use the manufacturer name and the product name concatenated together as the derived identifier. With the derived identifier, the node establishes a namespace for the mass storage device.

At block 611, the node records the namespace for the mass storage device. The namespace (e.g., manufacturer name) is associated with the device identifier. For example, a structure that hosts the device identifier is updated with a pointer to an entry of another structure that indicates the manufacturer's name.

At block 613, the node discovers the logical storage objects configured on the discovered mass storage device. The node may send a request to the mass storage device, and the mass storage device responds with a list of the logical storage objects configured on it. As another example, the node may query each port of the mass storage device that is visible to the node. The mass storage device responds with an indication of the logical storage object(s) associated with the port.

At block 615, an internal loop of operations begins for each of the discovered logical storage objects. This internal loop of operations includes blocks 617 and 619, with an ending control block at block 623.

At block 617, the node determines an identifier that is exclusive within the mass storage device namespace. Determination of the value or identifier exclusive within a namespace can vary from using a counter to complex mutations of values to avoid reuse of a value within the namespace.

At block 619, the node records an association of the namespace and the exclusive identifier as a name for the logical storage object. The node can record the association by adding a new entry into a structure that hosts logical storage object names within the cluster. The node can record the association by setting a pointer in a first structure of mass storage namespaces to reference a mutating value.

At block 621, the node determines whether there is an additional storage object. If there is, then control flows back to block 615. Otherwise, control continues to block 623.

At block 623, the node determines whether there is another discovered mass storage device. If there is another discovered mass storage device, then control flows to block 603. Otherwise, control flows to block 625.

At block 625, the process naming the logical storage objects returns an indication that discovery has been completed. This may be an initial discovery that has completed. A node may be configured to perform additional discoveries during the life of a clustered storage environment.

The flowcharts are provided to aid in understanding the illustrations and are not to be used to limit scope of the claims. The flowcharts depict example operations that can vary among aspects of the disclosure. Additional operations may be performed; fewer operations may be performed; the operations may be performed in parallel; and the operations may be performed in a different order. For instance, a block 301 of FIG. 3 may be performed before block 203. As another example, block 401 of FIG. 4 may be performed before block 211 of FIG. 2. Referring again to FIG. 2, block 201 may be repeatedly performed while the other operations of FIG. 2 are performed. Similarly, block 602 can be performed repeatedly while the other operations of FIG. 6 are performed. As another example of a variation, blocks 605 and 607 may not be explicitly performed as mentioned herein. A node can be configured to attempt to perform block 611. If a mass storage device namespace has already been taken, then the recording action will not complete and the node can skip to discovering the next mass storage device.

Further, reference to discovery during startup of a clustered storage environment should not be used to limit scope of the claims. After startup, mass storage devices can be added to a cluster. And additional logical storage objects can be introduced into a cluster (e.g., via a new mass storage device or newly configured on an existing mass storage device). When a new logical storage object is introduced, a process at the mass storage device can generate a notification that signals presence of the new logical storage object. A cluster member node that receives the notification can name the logical storage object by determining the mass storage device namespace, and assigning an exclusive identifier within that namespace to the logical storage object. Further, aspects of the disclosure can vary how removal of logical storage objects is handled. When a logical storage object is removed, a node can be configured to clear the corresponding name or mark the name as removed. The name can be reassigned to a new logical storage object or reserved in case the same logical storage object reappears.

The term "mass storage device" is used herein to refer to any physical storage device that stores data accessible by a machine. Examples of a mass storage device include a tape library, a redundant array of independent disks (RAID) system, one or more magnetic drives, one or more optical drives, one or more magneto-optical drives, and one or more solid state memory devices.

The term "logical storage object" is used herein to refer to an addressable object that is presented as a storage device. A logical storage object may be a virtual disk presented by a virtualized storage environment. A logical storage object may be a logical unit number (LUN). A logical storage object may be directly backed by a single physical storage device or directly backed by blocks across multiple physical storage devices. A logical storage object may be separated from any physical storage device by several layers of virtualization. Regardless of the particular aspect, the logical storage object is presented as an addressable unit from which data can be read and to which data can be read, and is not a physical storage device.

As will be appreciated by one skilled in the art, aspects of the disclosure may be implemented as a system, method or computer program product. Accordingly, aspects of the disclosure may take the form of a hardware aspect, a software aspect (including firmware, resident software, micro-code, etc.) or an aspect combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products according to aspects of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
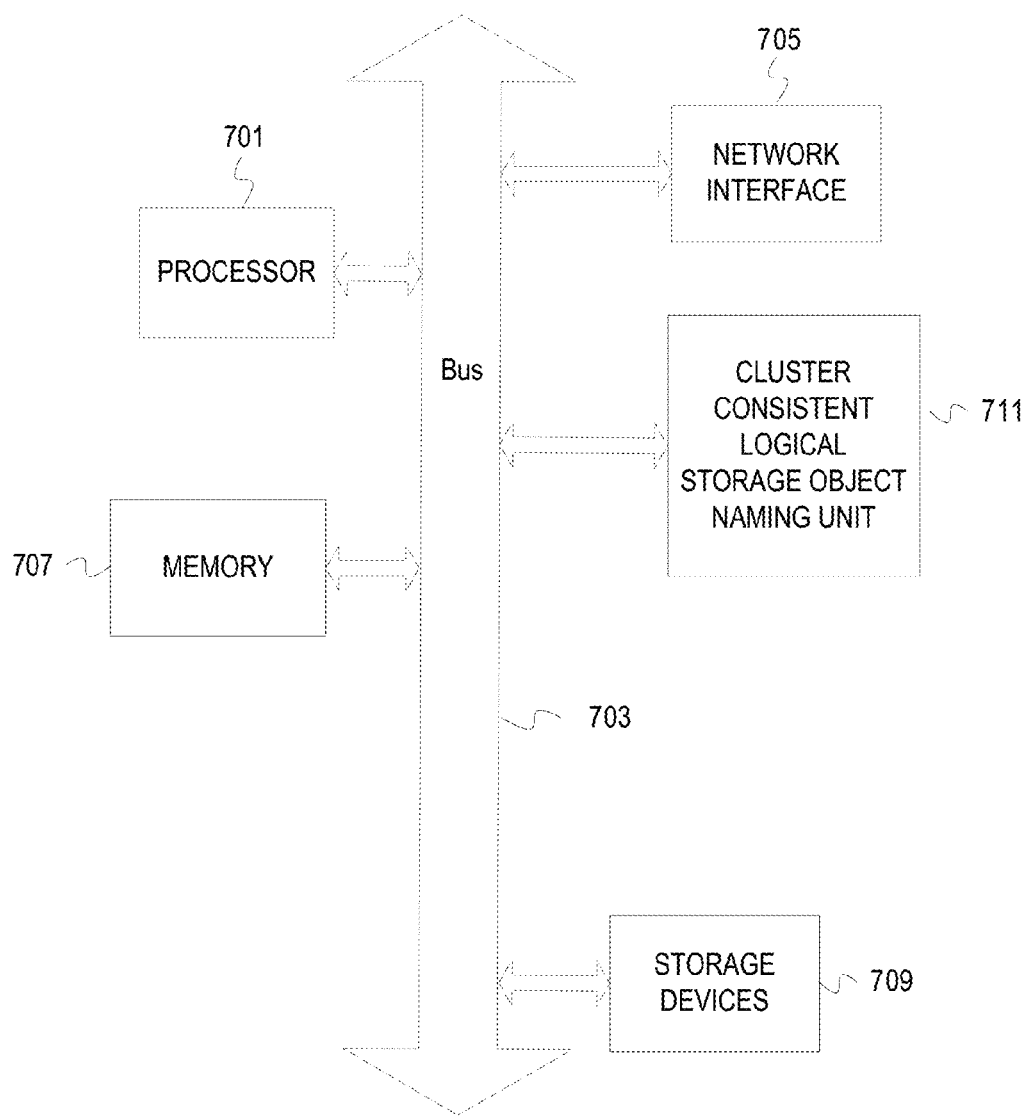
FIG. 7 depicts an example computer system with a cluster consistent logical storage object naming unit.

FIG. 7 depicts an example computer system with a cluster consistent logical storage object naming unit. A computer system includes a processor unit 701 (possibly including multiple processors, multiple cores, multiple hosts, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, NuBus, etc.), a network interface 705 (e.g., an ATM interface, an Ethernet interface, a Frame Relay interface, SONET interface, wireless interface, a Fiber Channel interface, an Infiniband® interface, etc.), and a storage device(s) 709 (e.g., optical storage, magnetic storage, etc.). The computer system also includes a cluster consistent logical storage object naming unit 711. The cluster consistent logical storage object naming unit 711 names logical storage objects in a clustered storage environment based on a namespace of a mass storage device that hosts the logical storage objects. Any one of these functionalities may be partially (or entirely) implemented in hardware and/or on the processing unit 701. For example, the functionality may be implemented with an application specific integrated circuit, a field programmable gate array, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701, the storage device(s) 709, and the network interface 705 are coupled to the bus 703. Although illustrated as being coupled to the bus 703, the memory 707 may be coupled to the processor unit 701.

While the aspects are described with reference to various aspects and exploitations, it will be understood that these aspects are illustrative and that the scope of the disclosure is not limited to them. In general, techniques for naming logical storage objects in a clustered storage environment as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of . . . or" should not be construed to be exclusive. For instance, the phrase "X comprises at least one of A, B, or C" does not mean that X comprises only one of {A, B, C}; it does not mean that X comprises only one instance of each of {A, B, C}, even if any one of {A, B, C} is a category or sub-category; and it does not mean that an additional element cannot be added to the non-exclusive set (i.e., X can comprise {A, B, Z}).

What is claimed is:

1. A method comprising:
    determining, by one of a plurality of storage node computing device in a clustered storage environment, an identifier of a mass storage device in the clustered storage environment;
    discovering, by the one of the storage node computing devices, a logical storage object of the mass storage device, wherein the logical storage object is accessible to one of the storage node computing devices via a first port and another of the storage node computing devices via a second port;
    generating, by the one of the storage node computing devices, a namespace based, at least in part, on the identifier of the mass storage device;
    determining, by the one of the storage node computing devices, a value that is exclusive within the namespace; and
    generating, by the one of the storage node computing devices, a name for the logical storage object, the name comprising both the namespace and the value that is exclusive within the namespace.

2. The method of claim 1, wherein said identifier of the mass storage device comprises a unique identifier of the mass storage device.

3. The method of claim 1, wherein said determining the value that is exclusive within the namespace comprises maintaining a counter for the namespace.

4. The method of claim 1, wherein said generating the namespace comprises determining a name of a manufacturer of the mass storage device, a product name for the mass storage device, a model number of the mass storage device, a serial number of the mass storage device, or a distributor of the mass storage device.

5. The method of claim 4, further comprising recording, by the one of the storage node computing devices, the name in a data structure accessible by each of the storage node computing devices in the clustered storage environment.

6. The method of claim 1, wherein said generating the name comprises concatenating the namespace and the value that is exclusive within the namespace.

7. A non-transitory machine-readable storage medium having stored thereon instructions comprising machine executable code, which when executed by at least one machine causes the machine to:
    determine an identifier of a mass storage device in a clustered storage environment;
    discover a logical storage object of the mass storage device, wherein the logical storage object is accessible to one of a plurality of storage node computing devices via a first port and another of the storage node computing devices via a second port and the storage node computing devices are in the clustered storage environment;
    generate a namespace based, at least in part, on the identifier of the mass storage device;
    determine a value that is exclusive within the namespace; and
    generate a name for the logical storage object, the name comprising both the namespace and the value that is exclusive within the namespace.

8. The non-transitory machine-readable storage medium of claim 7, wherein the identifier of the mass storage device comprises a unique identifier of the mass storage device.

9. The non-transitory machine-readable storage medium of claim 7, wherein the machine executable code, when executed by the at least one machine, further causes the machine to maintain a counter for the namespace.

10. The non-transitory machine-readable storage medium of claim 7, wherein the machine executable code, when executed by the at least one machine, further causes the machine to determine a name of a manufacturer of the mass storage device, a product name for the mass storage device, a model number of the mass storage device, a serial number of the mass storage device, or a distributor of the mass storage device.

11. The non-transitory machine-readable storage medium of claim 7, wherein the machine executable code, when executed by the at least one machine, further causes the machine to record the name in a data structure accessible by each of the storage node computing devices in the clustered storage environment.

12. The non-transitory machine-readable storage medium of claim 7, wherein the machine executable code, when executed by the at least one machine, further causes the machine to concatenate the namespace and the value that is exclusive within the namespace to generate the name.

13. A storage node computing device, comprising:
a memory containing machine readable medium comprising machine executable code having stored thereon instructions for cluster consistent logical storage object naming; and
a processor coupled to the memory, the processor configured to execute the machine executable code to cause the processor to:
determine an identifier of a mass storage device in a clustered storage environment;
discover a logical storage object of the mass storage device, wherein the logical storage object is accessible to the storage node computing device via a first port and another storage node computing device via a second port and the storage node computing device and the another storage node computing device are in the clustered storage environment;
generate a namespace based, at least in part, on the identifier of the mass storage device;
determine a value that is exclusive within the namespace; and
generate a name for the logical storage object, the name comprising both the namespace and the value that is exclusive within the namespace.

14. The storage node computing device of claim 13, wherein the identifier of the mass storage device comprises a unique identifier of the mass storage device.

15. The storage node computing device of claim 13, wherein the processor is further configured to execute the machine executable code to cause the processor to maintain a counter for the namespace.

16. The storage node computing device of claim 13, wherein the processor is further configured to execute the machine executable code to cause the processor to determine a name of a manufacturer of the mass storage device, a product name for the mass storage device, a model number of the mass storage device, a serial number of the mass storage device, or a distributor of the mass storage device.

17. The storage node computing device of claim 13, wherein the processor is further configured to execute the machine executable code to cause the processor to record the name in a data structure accessible by each of the storage node computing device and the another storage node computing device.

18. The storage node computing device of claim 13, wherein the processor is further configured to execute the machine executable code to cause the processor to concatenate the namespace and the value that is exclusive within the namespace to generate the name.

* * * * *